Patented June 12, 1928.

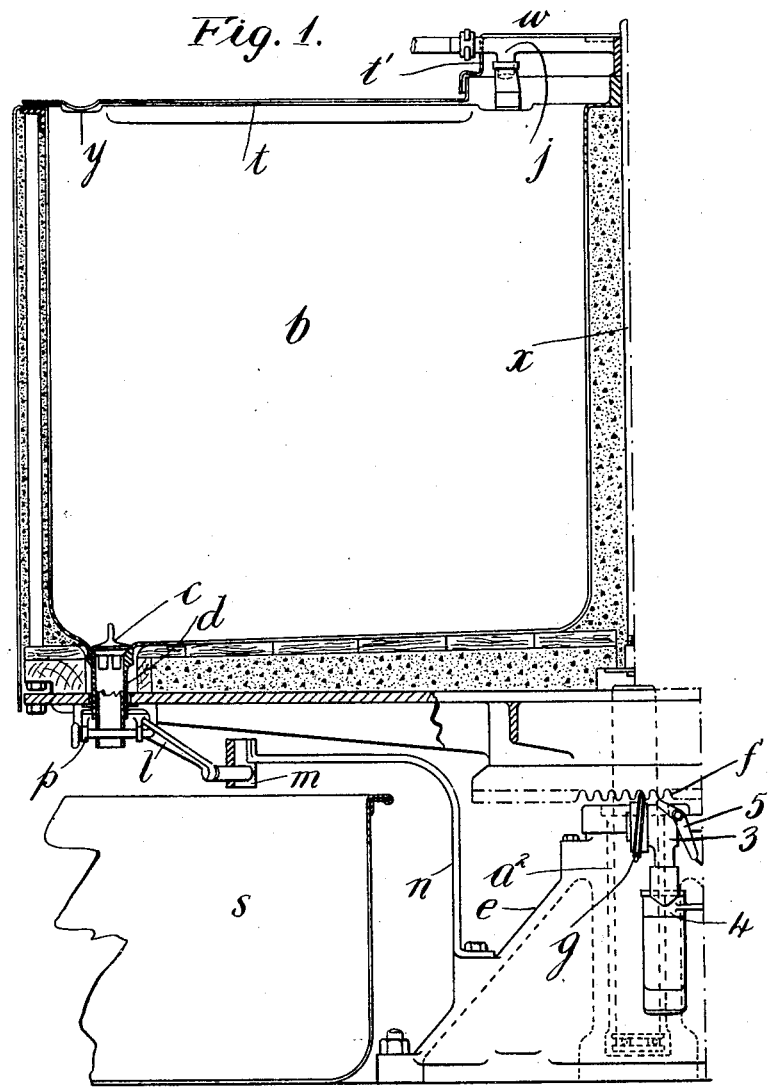

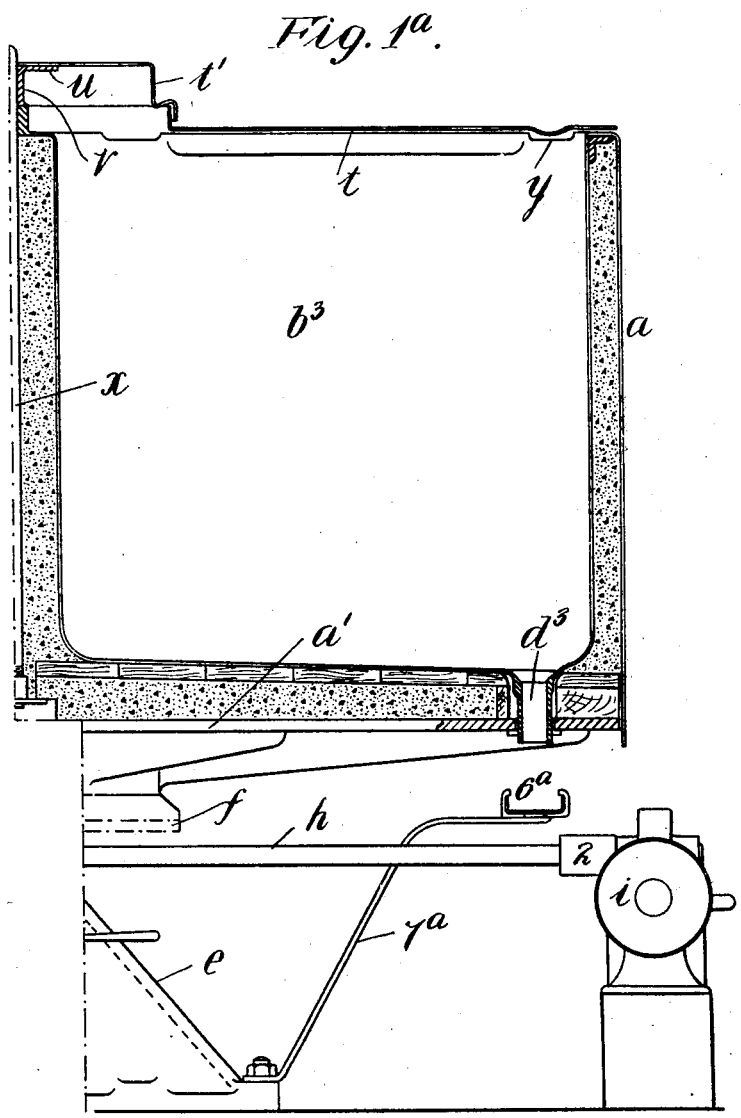

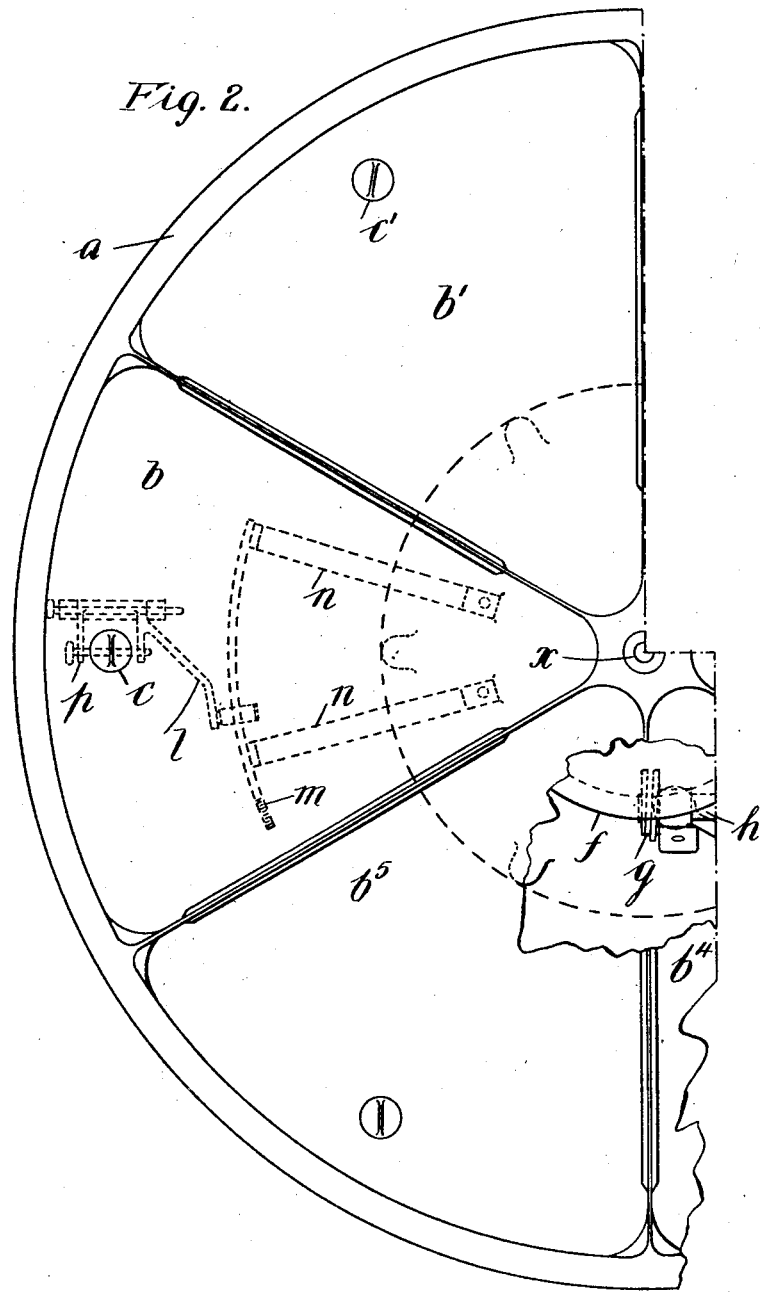

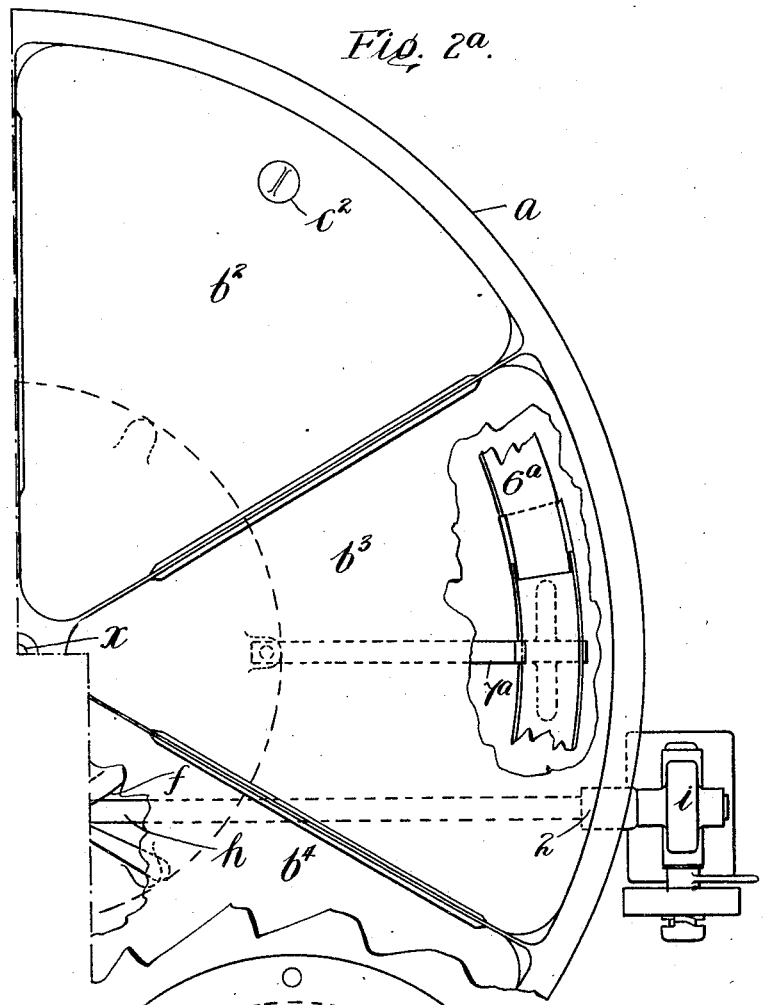
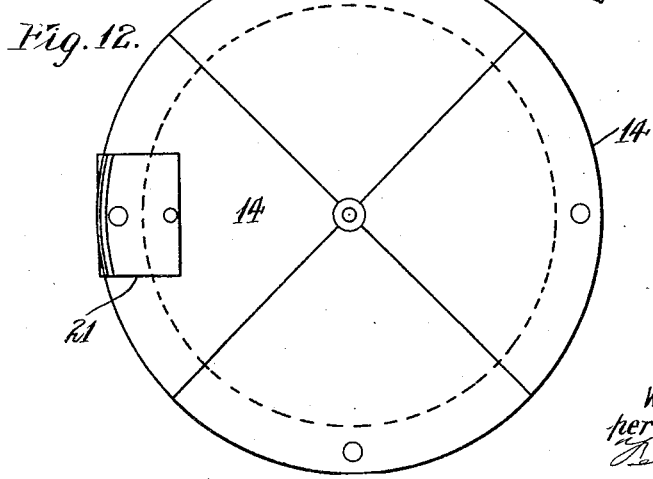

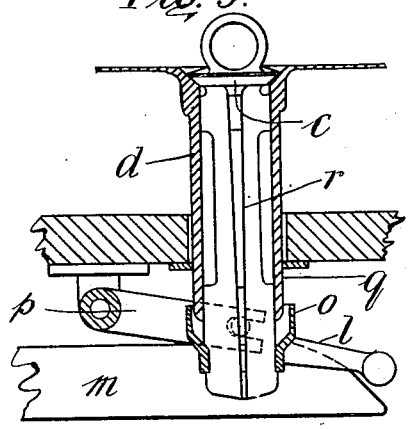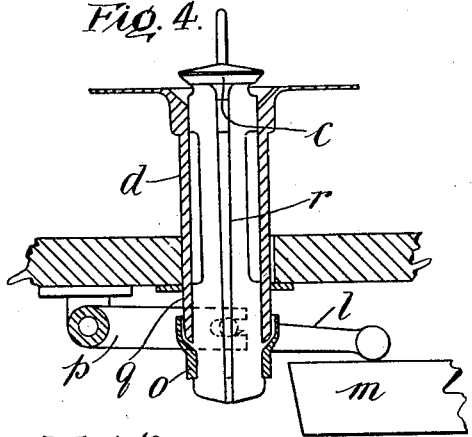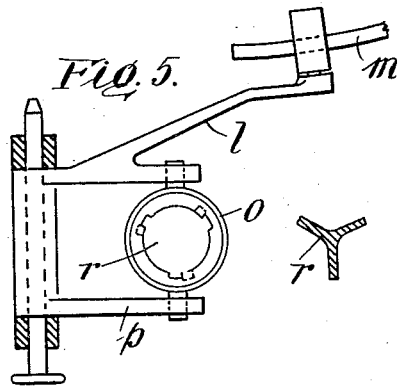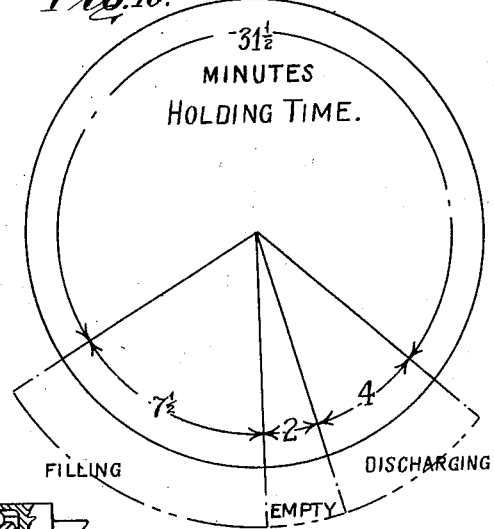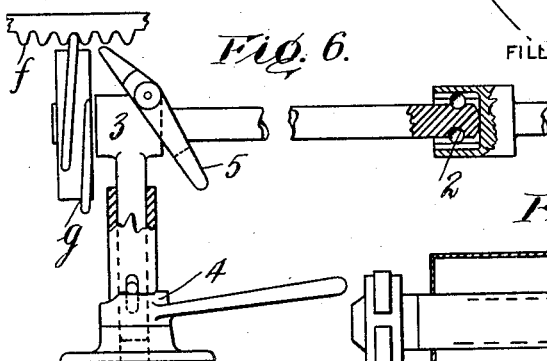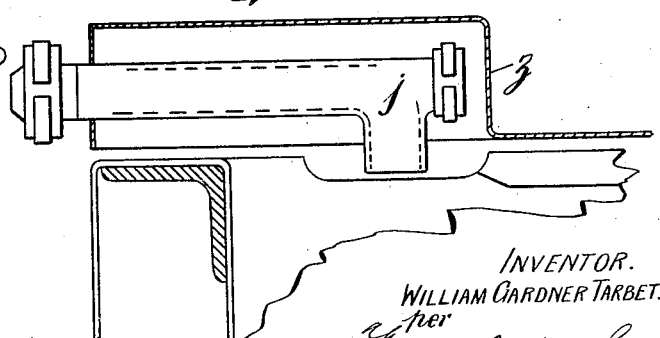

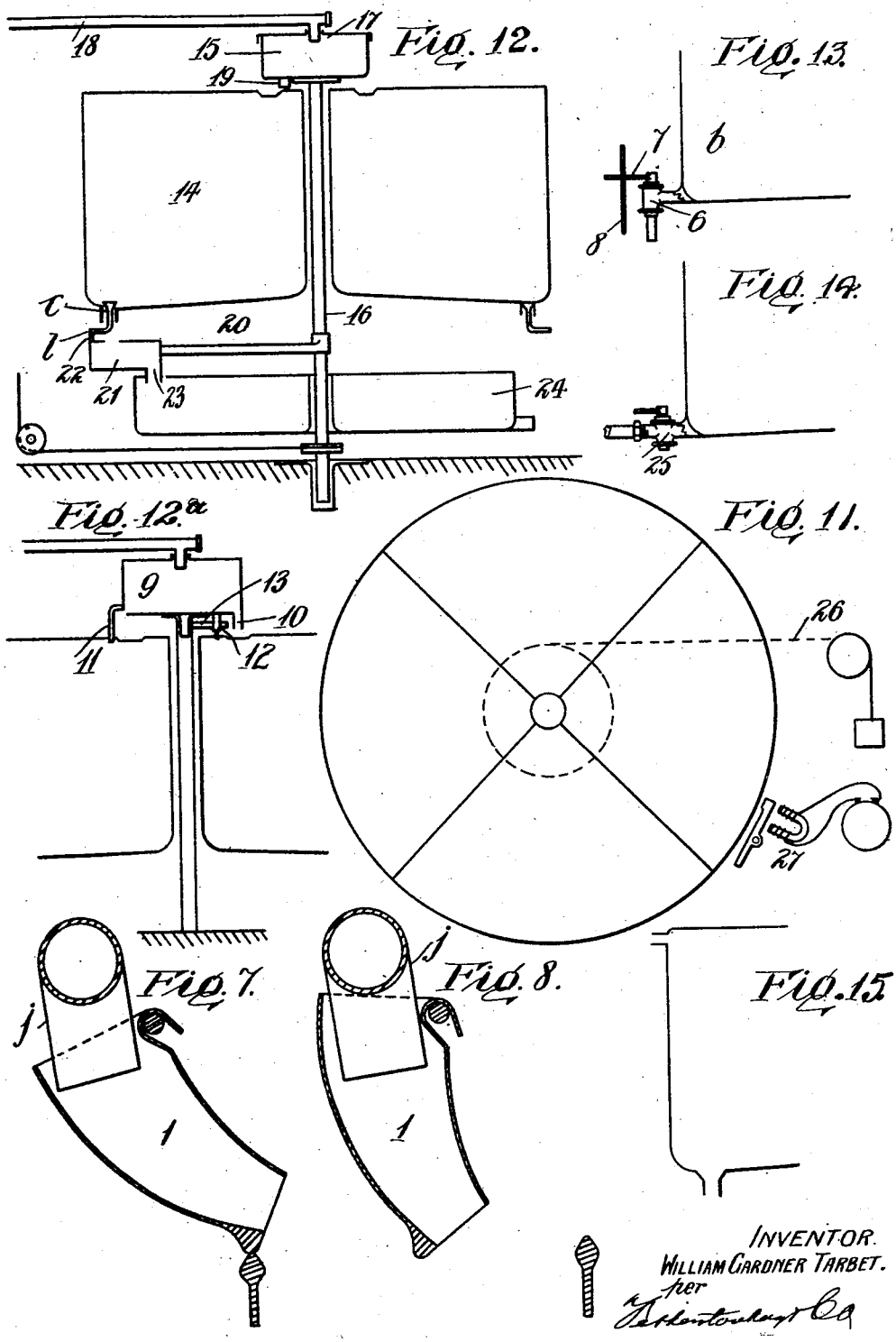

1,673,215

UNITED STATES PATENT OFFICE.

WILLIAM GARDNER TARBET, OF LONDON, ENGLAND, ASSIGNOR TO THE ALUMINUM PLANT & VESSEL COMPANY, LIMITED, OF POINT PLEASANT, LONDON, ENGLAND.

STERILIZING AND PRESERVING LIQUIDS.

Application filed November 9, 1923, Serial No. 673,787, and in Great Britain November 10, 1922.

The present invention relates to improvements in and relating to sterilizing and preserving liquids and being particularly applicable to the Pasteurization of milk under commercial conditions it will be hereinafter described in that application.

The present invention deals with improved means for holding the liquid by the so-called "positive" or "absolute" holding method wherein the liquid previously heated is admitted in succession to several tanks or holders designed to maintain the liquid within certain limits of temperature for a definite time, held quietly therein for a definite length of time, and then discharged in turn.

There has been proposed a cyclically operating holding system wherein a plurality of vessels having no communication on the holding side are related in succession to a feeding stream issuing from a single way delivery device, and the charges after being held for a definite time are discharged in succession, each vessel discharging through its own valve into a receiving pipe common to all of the compartments in the container, and communication is had between this pipe and each exhaust valve mechanism by branch pipes. In this apparatus a stationary comparted container is used, and a feed pipe opening into a receiver having a spout for discharging the heated milk successively into the various compartments of the container. The aforementioned receiver is mounted upon the upper end of a revolving shaft so that as the shaft rotates the receiver is carried therewith and causes the spout to be positioned successively over the various compartments of the container and successively fill them. Each of the compartments is provided with an automatically operable outlet valve, each valve being operated at predetermined intervals by an arm carried by the revolving shaft so as to cause the compartments to successively empty. The common receiving pipe to all of the compartments is arranged below the container.

The provision of a common receiving pipe to all the compartments in the container and branch pipes leading therefrom to each of the exhaust valves, or any rotating valve having connections from the heater to the holding tanks and to the cooler is open to the serious objection that untreated or insufficiently treated liquid may at any time leak through the outlet valves and pass into and reinfect the finished product. with such a common receiver and outlet valves, or with such a common rotating valve, abrasion or cutting, the intrusion of a brush bristle, or uneven contraction after expansion, etc., may occur at any time without the operator's knowledge and cause a seepage leak that completely destroys the efficiency of Pasteurizing which the apparatus is supposed to effect.

The present invention overcomes this disadvantage and to this end the present invention broadly consists in sterilizing or Pasteurizing milk and other liquids by the "positive" or "absolute" holding method as carried out by a cyclically operating holding system of the kind described, wherein the discharge or outlet valves have no communication with each other, and except at time of discharge, with any receiver, conduit, or like for the finished product, whereby reinfection by leakage or short circuiting of any charge during the holding time or while being withdrawn is definitely prevented.

The travelling system may take divers forms; the holders may be intermittently or continuously carried round a circuit as a rotary system, or as a closed loop system, or they may travel to and fro.

In order that the present invention may be the more clearly understood, we will describe with the aid of the accompanying six sheets of drawings, a simple, convenient and advantageous mechanically actuated embodiment thereunder in the form of a radially comparted rotary tank with a fixed delivery and direct discharge to the collecting receiver.

In the drawings:—

Figs. 1 and 1ª combined form a part vertical section.

Figs. 2 and 2ª combined, a plan.

Figs. 3 and 4 vertical sectional views of one of the discharge valves in the closed and open positions respectively, and showing co-operating details for automatically opening and closing the valve.

Fig. 5 is a plan view of the valve and the aforesaid co-operating details.

Fig. 6 is a detail in side elevation and partly in section of the tank drive and means for freeing the tank for manual rotation.

Figs. 7 and 8 are vertical sections of a positive trip for quick diversion of the feeding stream from one holder to the next.

Fig. 9 is a vertical section through the marginal part of a fixed cover showing a convenient way of introducing the single-way delivery device.

Fig. 10 is a timing diagram of a working cycle which serves well to illustrate applicant's device.

Fig. 11 depicts by way of example only one way of imparting a step by step drive to a rotary tank in cases where intermittent movement of the rotary tank is desired.

Figs. 12 and 12$^a$ depict by way of example only, other form of trip delivery for quickly diverting the feeding stream from one holder to the next.

Fig. 13 depicts by way of example only, another form of mechanically actuated discharge valve embodying a bib cock with extended arm and a pillar contact device.

Fig. 14 depicts by way of example only, a hand operated discharge cock, the outlet of which may register with and if desired be coupled with a stationary pipe for discharge.

Fig. 15 depicts overflow provision at a convenient height in each holder and delivering outside the apparatus to guard against liquid from any holder flowing over to any other.

In carrying the present invention into practical effect, a rotary tank $a$, preferably of aluminium or heavily tinned copper, with rounded corners consists of a number of radial compartments or sections, or an equivalent grouped series of separate holders for example, six sections or holders, $b$, $b'$, etc., mounted on a base $a'$ and insulated therefrom by suitable non-conducting materials, each section is provided with its own mechanically operated discharge valve $c$, $c'$, etc., which has no communication with any other valve and is normally closed conveniently by its own weight and the weight of an allied lever by which it is automatically lifted as hereafter appears.

Conveniently and advantageously the floor of each section slopes downwards to the outlet $d$, $d'$, etc., controlled by the valve $c$, $c'$, etc., the outlet being located in the floor adjacent the periphery of the tank.

The tank base $a'$ is rotatably mounted, for example, by means of a vertical shaft footstep bearing $a^2$ in a conical pedestal $e$, and means are provided for imparting a timed drive of rotation, for example, the worm wheel $f$, and worm gear $g$, the worm $g$ being fast on the shaft $h$ which is driven at a desired rate of speed from any available source of power, appropriate reduction gear $i$ being interposed when necessary.

Above the tank $a$ is a non-rotating liquid delivery arm or spout $j$, from which each section $b$, $b'$, etc., is charged up to a predetermined level as controlled by the rate of flow as it passes slowly thereunder.

Under the tank is an appropriate contact device for automatically opening the valves $c$, $c'$, etc., as the sections $b$, $b'$, etc., arrive successively at the discharging station.

With a lift lever $l$ as shown, a contact device consisting of a sloping ramp $m$ giving an easy lift and quick fall-off of the lever $l$ serves well.

The ramp $m$ is readily supported by brackets $n$ bolted to a step of the pedestal $e$, and the lever $l$ may be linked to the valve $c$, $c'$, etc., through the mediation of a socket $o$ mounted by trunnions in a fork $p$ of the lever $i$, the socket expanding above to slide over or being constructed to slide within the lower end of the depending casing $q$ of the valve, and being slotted below to connect bayonet fashion with the valve stem $r$, which for this purpose is conveniently of spider section recessed at the lower part to permit the valve stem to turn and lock in the socket $o$ in well understood manner.

Or, otherwise, as shown in Fig 2 the lantern valve $c$ may be pivoted direct to the lever fork $p$.

Any appropriate form of valve or cock and cooperating contact device may be employed. For example Fig. 13 shows how each holder $b$, $b'$, etc., may be provided with a bib cock 6 with extending arm 7 which, in the course of the travel of the holder contacts with a pillar 8, and is rotated thereby to open the bib cock 6. Closing of the cock may be effected by a spring or a like or similar device.

It will now be understood that during each and every complete revolution of each and every section, there is a holding period lasting from the moment any section leaves the charging station to the moment the section is opened for outflow at the discharging station, and that this holding period is truly "positive" or "absolute" inasmuch as the sections are devoid of any source of intercommunication whatsoever other than by actual overflow, a condition that can only arise by most improper working of the apparatus, and which can be guarded against, if considered necessary, by fitting to each section an overflow delivering outside the apparatus as shown in Fig. 15.

The larger evil arising from such a contingency stepping in, viz, of reinfecting the contents of a collecting receiver $s$ into which the sections $b$, $b'$, etc., discharge, by milk overflowing from the section in immediate advance of that still open for discharge may be practically ruled out by so ordering the relation of the charging rate to the discharging rate and arranging the automatic closing of the discharging valve accordingly that the discharging section is emptied and the valve closed some time before the immediately preceding section is filled up to the predetermined level. By way of example only, Fig. 10 illustrates this in a cycle of operations in which the filling time occupies 7½ minutes, the holding time 31½ minutes, the discharging time 4 minutes, and a neutral time of 2 minutes, during which neutral time the section immediately following that still presented to the feeding stream travels empty and with its outlet closed. At the beginning of the neutral time the section being filled should be about three quarters charged. In this way reinfection risk by overflow is practically eliminated.

It will be observed that by simple means not under the control of the operator of the apparatus, all the foregoing times are controlled and can be varied to suit different conditions such as by altering the position or length of the ramps $m$, the areas of the discharge outlets $d$, or the rate of rotation.

The rotary tank $a$ is furnished with an appropriate cover. If as is at present preferred, the feeding stream as shown in Fig. 1 delivers at the medial part of the tank, a cover consisting of an outer rotating part $t$ and a medial stationary part $t'$ serves well, the part $t'$ resting on a flange $u$ of an eye $v$ by which a delivery arm $w$ with a branch $j$ is supported on a shoulder of a vertical spindle $x$ of the tank $a$, the spindle $x$ rotating freely in the eye $v$ and the cover part $t'$.

The cover part $t'$ may with advantage be radially slotted to admit the delivery arm and have a down turned lip to overhang an upturned lip of the cover part $t$ for dust exclusion.

The cover part $t$ may with advantage be provided with an internal bead $y$ for returning condensation to the tank.

In cases where the feeding stream may be desired to deliver at the peripheral part of the tank, a non-rotating cover such as $z$, Fig. 9, may be provided having a local elevated part for the intrusion of the delivery arm, the cover $z$ fitting closely to but not actually contacting with the tank rim.

To prevent or reduce splashing, etc., when the section partitions cut the charging stream or jet the tops of the partitions may be locally brought to a knife edge.

Or a trip delivery device may be adopted to quickly divert the feeding stream from one section to the next.

By way of examples only of trip deliveries which will serve, a rocking spout 1, Figs. 7 and 8, projects into the path of the tops of the section partitions and rising as each goes by, suddenly drops off the partition and directs the feeding stream into the next section.

Or a small rotary tank 9 Fig. 12, above the sections having a delivery spout 10 is furnished with two springs 11 and 12, of which spring 11 projects into the path of the tops of the section partitions, and spring 12, as the tank 9 is rotatably displaced by a partition pressing against spring 11, contacts with a fixed arm 13, the arrangement being such that spring 11 reaches a tension of release and releases itself at the time that spring 12 has received a tension which serves to suddenly return the tank 9 to its original position and so bring the spout 10 rapidly over the partitions.

To facilitate cleaning operations provision is made to disconnect the tank drive, but without unlocking the tank against reverse rotation, it being desirable to prevent rotation at all times.

With the worm drive depicted, it is convenient to interpose a universal joint 2 in the driving shaft $h$, and provide a rise and fall bearing 3 by which through a rotating edge cam 4 the worm $g$ may be engaged with or disengaged from its worm wheel $f$, a pivoted locking pawl 5 carried on the bearing 3 stepping in in either position of the worm $g$ to prevent backward rotation of the tank $a$.

In cases where it is desirable to meet a demand for machines of small capacity scarcely calling for power operation the revolving parts may be worked by hand, also the discharge valves such as the cocks 25, Fig. 14 as they arrive at discharging position, or mechanical means such as hereinbefore described may be fitted for valve operation.

Such a hand operated machine would in general for ordinary purposes be step-wise operated and a timing device is interposed to prevent the possibility of the machine being rotated at any but the predetermined moments. Also means are provided such as a stationary guard ring around the machine and gapped at the discharging station so that the cock can only be opened there.

Any power driven machine may also be operated step-wise or intermittently if desired. In Fig. 11 is shown one way of doing this by a weight, pulley and cord device 26 for rotating the rotary tank $a$ as the tank is released by a time operated magnetic brake 27. Another way allowing the use of any form of drive intermittently is by the operation of an interposed electrically timed and operated clutch.

Should agitation of the contents of the holders b, b′, etc., during the holding time be found desirable appropriate provision not shown may be made therefor.

During the travel of the holders b, b′, etc., from and to the receiving vessel s, the discharge valves c, c′, etc., may pass over a drip trough 6ᵃ, that shown in Fig. 1 being conveniently supported by brackets 7ᵃ bolted to the base flange of the pedestal e, this trough conveying the liquid into some separate receptacle having no communication with the holders or the receiving vessel s.

Any usual or appropriate lagging of the tank and its cover or the tank only may be adopted, that shown being given by way of example only.

Use may be made of any available or conveniently arranged space in the apparatus for heating purposes, the introduction of one or more hot water coils (not shown) being one example of heating which will serve.

The shape of the tank or of the individual holders may vary according to the space available or other considerations.

By a travelling system or method substantially as described "positive" or "absolute" holding of milk or other liquid without short circuiting and with a comparatively low gallonage or capacity of the holders and economy of time is realized.

It is to be understood that numerous constructional changes may be made without departing from the spirit and scope of the present invention, and we therefore do not wish to be understood as limiting ourselves by the positive terms employed in connection with the description, excepting such as the state of the art may require.

What I claim is:—

1. Apparatus of the kind described for sterilizing or Pasteurizing liquids by the "positive" or "absolute" holding method, comprising a series of travelling holders, a separate discharge valve for each holder, means for moving said holders, a stationary cover a non-moving delivery device for successively filling the holders, means for opening said discharge valves at a predetermined moment only for successively emptying said holders, and a receiver for the finished product, the discharge valves having no communication with each other, and, except at time of discharge, with said receiver.

2. Apparatus of the kind described for sterilizing or Pasteurizing liquids by the "positive" or "absolute" holding method comprising a support, means for imparting to said support a timed drive of rotation, means for disconnecting said drive, a grouped series of holders on said support, a non-rotating delivery device for successively filling said holders, a separate discharge valve for each holder, means for opening said discharge valves at a predetermined moment only for successively emptying said holders, and a receiver for the finished product, the discharge valves having no communication with each other, and except at time of discharge, with said receiver.

3. Apparatus as claimed in claim 10 hereof having means for preventing reverse-movement of said support.

4. Apparatus of the kind described for sterilizing or Pasteurizing liquids by the "positive" or "absolute" holding method, comprising a support, means for rotating said support, a grouped series of holders on said support, a non-rotating delivery device for successively filling said holders, means for quickly diverting the feeding stream from one holder to the next, a separate discharge valve for each holder, means for opening said discharge valves at a predetermined moment only for successively emptying said holders, and a receiver for the finished product, the discharge valves having no communication with each other, and, except at time of discharge, with said receiver.

5. Apparatus of the kind described for sterilizing or Pasteurizing liquids by the "positive" or "absolute" holding method, comprising a support, means for rotating said support, a grouped series of holders on said support, a non-rotating delivery device at the medial part of said rotary holder system for successively filling said holders, a cover for said holder system consisting of an outer rotating part and a stationary medial part a separate discharge valve for each holder, means for opening said discharge valves at a predetermined moment only for successively emptying said holders, and a receiver for the finished product, the discharge valves having no communication with each other, and except at time of discharge, with said receiver.

6. Apparatus of the kind described for sterilizing or Pasteurizing liquids by the "positive" or "absolute" holding method, comprising a grouped series of holders, a support therefor, a vertical shaft on which said support is rotatably mounted, means for imparting a timed drive of rotation to said shaft, a non-rotating liquid delivery arm above said grouped series of holders, means for quickly diverting the feeding stream from one holder to the next, a discharge valve for each holder, a contact device for automatically opening the said discharge valves as the holders arrive successively at a discharge station, a receiver for the finished product at said discharge station, said discharge valves having no communication with each other, and, except at time of discharge, with said receiver.

7. Apparatus of the kind described for sterilizing or Pasteurizing liquids by the "positive" or "absolute" holding method, comprising a support, means for intermittently rotating said support, a grouped series of holders on said support, a non-rotating delivery device for successively filling said holders, a separate discharge valve for each holder, means for opening said discharge valves at a predetermined moment only for successively emptying said said holders, and a receiver for the finished product, the discharge valves having no communication with each other, and, except at time of discharge with said receiver.

In testimony whereof, I affix my signature.

WILLIAM GARDNER TARBET.